United States Patent [19]

Cahill et al.

[11] Patent Number: 5,428,558
[45] Date of Patent: Jun. 27, 1995

[54] CORRECTION OF SPECTRA FOR STRAY RADIATION

[75] Inventors: Jerry E. Cahill; Alan M. Ganz, both of Trumbull; Paul Saviano, Norwalk; David Tracy, Norwalk; Yongdong Wang, Norwalk, all of Conn.

[73] Assignee: The Perkin-Elmer Corporation, Norwalk, Conn.

[21] Appl. No.: 168,800

[22] Filed: Dec. 17, 1993

[51] Int. Cl.$^6$ .......................................... G01D 18/00
[52] U.S. Cl. .................... 364/571.02; 73/1 G; 250/252.1; 356/307; 364/498; 364/571.01; 364/571.04
[58] Field of Search ............... 73/1 G; 250/252.1; 356/307; 364/498, 571.01, 571.02, 571.04

[56] References Cited

U.S. PATENT DOCUMENTS

| | | | |
|---|---|---|---|
| 3,790,797 | 2/1974 | Sternberg et al. | 356/307 X |
| 3,790,798 | 2/1974 | Sternberg et al. | 250/345 |
| 4,820,048 | 4/1989 | Barnard | 356/328 |
| 5,023,804 | 6/1991 | Hoult | 364/498 |
| 5,121,337 | 6/1992 | Brown | 364/498 |
| 5,229,838 | 7/1993 | Ganz et al. | 356/328 |
| 5,341,206 | 8/1994 | Pittaro et al. | 356/301 |

Primary Examiner—Edward R. Cosimano
Attorney, Agent, or Firm—Edwin T. Grimes; Herbert S. Ingham

[57] ABSTRACT

A method and apparatus are provided for correction of spectra for stray radiation in a spectrometric instrument, involving a sequence of steps as follows. Spectral patterns are obtained with the instrument initially for monochromatic radiation at a plurality of selected calibration wavelengths. By computer program, the peak profile at the calibration wavelength in each pattern is replaced with a substitute based on the remaining pattern. The resulting data are interpolated to effect values denoted "stray proportions" for the ordered wavelengths of the instrument. Spectral data at each ordered wavelength are obtained with the instrument for a sample, and multiplied in the computer program by stray proportions for corresponding wavelengths to effect further sets of values denoted "stray portions" that are identified to the ordered wavelengths. Each set is identified to one of the wavelength increments of the instrument across the spectral range. In each set, the stray portions for the ordered wavelengths are summed. The total for each wavelength increment is subtracted from the original sample data for the increment to effect spectral data corrected for stray.

34 Claims, 10 Drawing Sheets

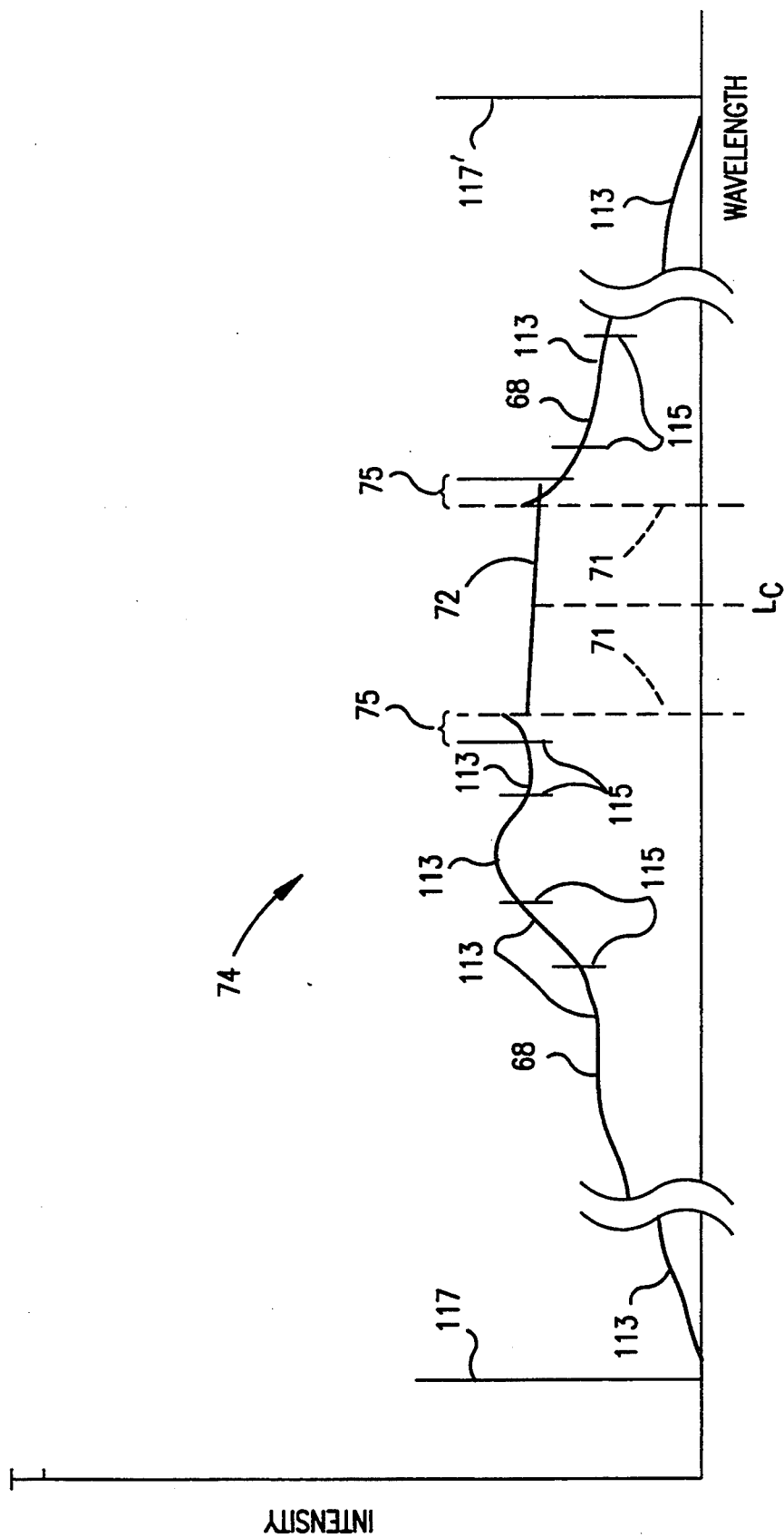

CORRECTION OF SPECTRA FOR STRAY RADIATION

This invention relates to spectrometric instruments, and particularly to making corrections for stray radiation in such instruments.

BACKGROUND OF THE INVENTION

Spectrometric instruments generally function to provide a spectral analysis of radiation pertaining to a sample or an astronomical source. The radiation source and/or the sample may be internal or external to the instrument. The instrument includes a wavelength analyzer, which comprises a spectral dispersion element such as a prism or, more commonly in precision instruments, an optical grating. The analyzer further includes a detector system. In one type, the detector has a single photosensitive component with a narrow entrance slit, and the dispersion element is mechanically rotated to scan a range of radiation wavelengths over the detector. In another type, the detector has an array of photosensitive pixel areas for detecting spectral increments across the range simultaneously. Array detectors have been made practical in solid state devices providing small adjacent pixels. The array may be either linear to receive a spectrum from a single dispersion element, or two dimensional for crossed dispersion elements. A two dimensional detector is disclosed in U.S. Pat. No. 4,820,048 (Barnard).

Modern precision spectrometric instruments include computer programming for calibration and treatment of the spectral information. U.S. Pat. No. 5,229,838 (Ganz et al) illustrates a grating with an array detector and teaches a system for calibrating amplitude linearity, and also teaches a particular type of instrument in which optical fibers are utilized to convey source radiation to a remote sample of liquid and back to the analyzer. U.S. patent application Ser. No. 834,448 filed Feb. 12, 1992 now Pat. No. 5,303,165, (Tracy et al), of the present assignee, discloses instrument standardization using computer programming, and also illustrates correction for background which generally represents radiation and instrument noise without the source in place. U.S. Pat. No. 5,023,804 (Hoult) teaches a method and apparatus for comparing spectra by means of computer programming.

With improvements in sensitivity resulting from advancing technology such as in the foregoing patents, it has been found that stray radiation is a limiting factor. Stray radiation results from imperfect gratings and internal reflections.

Therefore, objects of the invention are to provide a novel method and a novel apparatus to determine and correct for stray radiation in a spectrometric instrument. A further object is to provide improved spectral data that is corrected for stray radiation.

SUMMARY OF THE INVENTION

The foregoing and other objects are achieved by a method of correcting for stray radiation in a spectrum generated by a spectrometric instrument that includes a wavelength analyzer for effecting spectral data representative of spectral intensities in wavelength increments at ordered wavelengths across a spectral range.

A plurality of calibration wavelengths distributed across the spectral range is selected, the number of such wavelengths advantageously being substantially less than the number of ordered wavelengths. At each calibration wavelength, substantially monochromatic radiation is directed to the analyzer so as to effect an initial pattern of spectral data for the wavelength increments. The initial pattern has a peak profile at the calibration wavelength and is representative of stray radiation away from the peak profile. The initial pattern is normalized to effect a normalized pattern having a normalized peak profile. Away from the peak profile, the normalized pattern represents the proportion of the detected radiation of the calibration wavelength which is detected as stray radiation at each wavelength increment. The normalized peak profile is deleted from the normalized pattern to effect a remaining pattern. The peak profile may be delineated by fitting the initial pattern to a peak curve such as a Gaussian, determining a cutoff point on each side of the curve where data error from the curve exceeds a selected limit such as three times the noise level, and utilizing the cutoff points to delineate the peak profile therebetween.

A substitute profile is substituted for the normalized peak profile. The substitute is based on the remaining pattern, preferably by curve fitting to nearby points. Thus a resulting pattern of correction data is effected, the pattern being representative of stray radiation. The correction data of each pattern is identified to the associated calibration wavelength and to respective wavelength increments. Upon reorganization of the data, each wavelength increment has an associated set of correction data for the calibration wavelengths.

For each wavelength increment, the set of correction data is interpolated from the calibration wavelengths to the ordered wavelengths to effect stray proportions of radiation identified to the wavelength increment and respectively to the ordered wavelengths. It is useful to recognize that the ordered wavelengths represent source wavelengths for stray radiation, and the wavelength increments function as receptor increments of the stray. Thus each ordered wavelength has an associated set of stray proportions identified thereto, these proportions also being identified respectively to the wavelength increments.

The spectrometric instrument is operated with radiation from a sample source to effect spectral sample data for the wavelength increments and correspondingly for the ordered wavelengths. For each ordered wavelength, corresponding sample data is multiplied by each stray proportion identified to the ordered wavelength to effect stray portions of radiation identified to the ordered wavelength and respectively to the wavelength increments. Each wavelength increment thereby has an associated set of stray portions identified thereto.

For each wavelength increment, the stray portions identified thereto are summed to effect a total portion of stray radiation for the wavelength increment. The total portion is subtracted from the sample data of the wavelength increment, to effect corrected data. A set of corrected data effected for all wavelength increments is thereby representative of a spectrum of the sample radiation corrected for stray radiation.

Objects are also achieved by an apparatus for correcting for stray radiation in a spectrum generated by a spectrometric instrument that includes a wavelength analyzer for effecting spectral data representative of spectral intensities in wavelength increments at ordered wavelengths across a spectral range. The instrument is operable with radiation from a sample source to effect spectral sample data for the wavelength increments and correspondingly for the ordered wavelengths.

The apparatus comprises a source of monochromatic radiation operably disposed to direct substantially monochromatic radiation to the analyzer at each of a preselected plurality of calibration wavelengths distributed across the spectral range such that, for each calibration wavelength, an initial pattern of spectral data is effected for the wavelength increments. The initial pattern has a peak profile at the calibration wavelength and is representative of stray radiation away from the peak profile.

The apparatus further comprises means for normalizing the initial pattern to effect a normalized pattern, means for deleting the normalized peak profile from the normalized pattern to effect a remaining pattern for each calibration wavelength, and means for substituting for each normalized peak profile a substitute profile based on the remaining pattern so as to effect a pattern of correction data representative of stray radiation. The correction data is identified to a calibration wavelength and respectively to the wavelength increments, whereby each receptor increment has an associated set of correction data for the calibration wavelengths.

The apparatus further comprises means for interpolating the set of correction data for each receptor increment from the calibration wavelengths to the ordered wavelengths to effect stray proportions of radiation identified to the receptor increment and respectively to the ordered wavelengths. Each ordered wavelength has an associated set of stray proportions identified thereto and respectively to the wavelength increments.

The apparatus further comprises means for multiplying, summing and subtracting. Sample data is multiplied, for each wavelength increment and corresponding ordered wavelength, by each stray proportion identified to the ordered wavelength to effect stray portions of radiation identified to the ordered wavelength and respectively to the wavelength increments, whereby each wavelength increment has an associated set of stray portions identified thereto. The stray portions identified to each wavelength increment are summed to effect a total portion of stray radiation for the wavelength increment. The total portion for each wavelength increment is subtracted from corresponding sample data to effect corrected data for each receptor increment. A set of corrected data is thereby effected for the wavelength increments, representative of a spectrum of the sample radiation corrected for stray radiation.

BRIEF DESCRIPTION OF THE DRAWINGS

FIGS. 3A, 3B and 3C are a sequence of spectral profiles illustrating an aspect of the invention.

DETAILED DESCRIPTION OF THE INVENTION

The invention may be utilized generally with any conventional or desired spectrometric instrument that includes a wavelength analyzer for effecting spectral data representative of spectral intensities in wavelength increments at corresponding wavelengths ordered across a spectral range in ultraviolet, visible and/or infrared. For example, such an instrument may be a spectrophotometer for analyzing spectral absorbance, diffuse or spectral reflectance, luminescence such as molecular fluorescence and phosphorescence, or liquid chromatographic spectral absorption. The associated spectral analyzer of the instrument may comprise, for example, an optical grating, a prism, an acousto-optic tunable filter, or a scanning Fabry-Perot interferometer.

Figure 1:
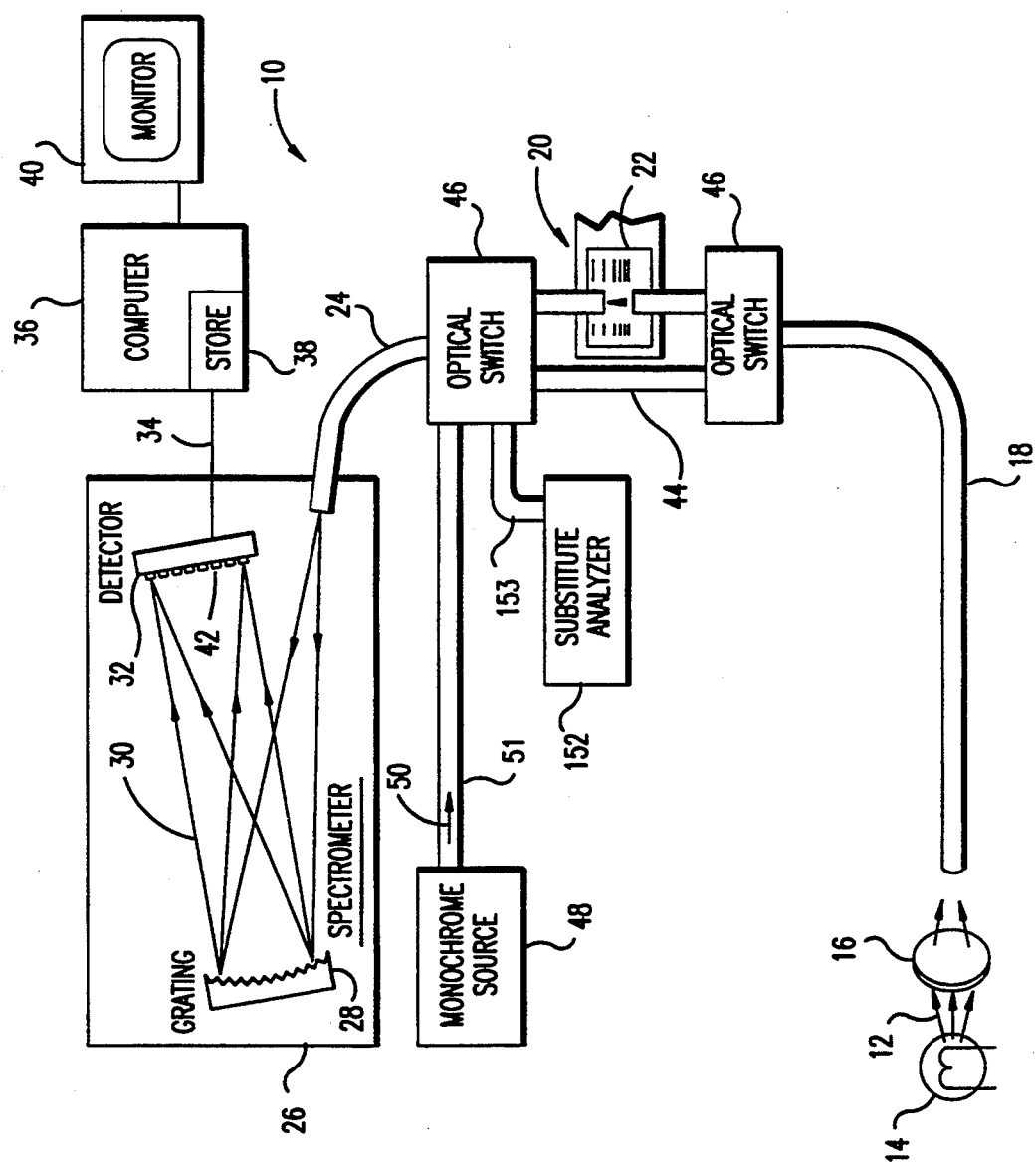
FIG. 1 is a schematic drawing of spectrometric apparatus incorporating the invention.

FIG. 1 illustrates such an instrument 10 which is a spectrophotometer for analyzing spectral absorption of a liquid at a location remote from the instrument, such as a Perkin-Elmer PIONIR 1024 (TM). This has a diode array type of detector for which the invention is particularly useful, but the invention also is applicable to scanning instruments having a single photoreceptor type of detector and a scanning dispersion element. Operation may be generally similar to that described in the aforementioned U.S. Pat. No. 5,229,838.

Radiation 12 from a broad-band light source 14, for example a tungsten-halogen lamp, is imaged by a lens 16 onto an optical fiber 18 which carries the light to a remote location 20 where it is passed through a sample liquid 22 before being picked up by a second optical fiber 24 and returned to the wavelength analyzing section 26 of the instrument. Various lenses (not shown) may be included conventionally in the optical train. In the analyzer 26 the radiation is directed to a concave optical grating 28 which disperses the radiation into a spectrum 30 that is received by a detector 32. Signals from the detector representing intensity versus wavelength are passed on an electrical line 34 to a data processor 36 where the signals are amplified and modified as appropriate, stored in memory 38 and eventually processed to provide output information. Transmitted intensity data representing a spectrum characteristic of the sample liquid may converted to absorbance data by applying a logarithm computation. Results after background correction and comparison with a standard are generally displayed on a monitor screen 40 and/or printed out.

The detector 32 is typically a solid state type such as a charge coupled detector (CCD) that has an array of photosensitive pixel receptors 42 that detect and generate signals representative of spectral intensities for corresponding wavelength increments dispersed from the grating and centered on corresponding wavelengths ordered across a spectral range. Pixel size may be about 25 microns. Wavelength increment size is proportional to the pixel size and inversely proportional to the grating dispersion; for example, the wavelength increment may be 0.3 nm. (The term "wavelength" as used herein and in the claims includes equivalent indicators such as wave number and frequency.) In the present example the detector has a linear array of pixels in the form of a single row of 1024 pixels disposed to define the spectral range of the instrument from about 800 to 1100 nm wavelength spectral range.

An additional optical fiber 44 may be inserted to bypass the sample with non-absorbed radiation to the analyzing section. The instrument is then operated via optical switches 46 with each fiber line to generate spectral intensity data, in each case with and without the light source. The optical switching 46 may be combined in a single unit and may comprise a beam splitter and shutter system not requiring the separate fiber 44 Data without the source, sometimes denoted "dark", accounts for background which is subtracted from each set of sample data to provide a corrected intensity. Transmittance ordinarily is computed as the ratio of corrected intensities for the sample and the bypass fiber.

According to the invention, to improve accuracy and standardization of the instrument, a further correction is made to each of the intensities to account for stray radiation within the instrument. If transmittance is to be computed, the correction is preferably made to intensity data before the transmittance computation. The stray radiation is radiation from each wavelength being spread by scattering from an imperfect grating and from reflections in the instrument to pixel locations not centered on that wavelength.

Correction for stray, according to the invention, is made by utilizing a substantially monochromatic source 48 of radiation 50 for a selected plurality (e.g. 151) of calibration wavelengths distributed across the spectral range of the instrument. The term "calibration wavelengths" herein refers to calibration for stray radiation, and not to ordinary instrument calibration which is outside the present realm. A suitable source is a double monochromator, i.e. a pair of sequenced dispersion gratings, for example a Model 77274 of Oriel Corp., Stratford, Conn.

The monochromatic source 48 is arranged with the main instrument 10 to direct substantially monochromatic radiation to the analyzer section 26. The band pass of this source should be as small as practical while providing sufficient intensity, e.g. about 1 nm. This source should pass its radiation first through an optical system that fills the wavelength analyzer in substantially the same way as the substituted section of the instrument, preferably by using the same type of optical fiber and any associated lenses. One way (not shown) is to substitute the monochromatic source for the broad-spectrum source in the instrument. In such case it is further possible but not necessary to include the sample section in the optical train.

In the aspect illustrated in FIG. 1, a separate optical train is utilized with the monochromatic source 48 to essentially duplicate the main optical train without the sample section. The source 48 passes its monochromatic radiation 50 through an optical fiber system including an optical fiber 51 having the same core size and numerical aperture as the instrument fibers 18, 24 and associated lenses (if any; none shown) the same as instrument lenses. The fiber 51 is shown connected through optical switching 46. Alternatively, however, as the utilization of the source 48 is generally done at the factory, it is advantageous simply to disconnect fiber 24 from the switching and temporarily connect it directly to the fiber 51 by means of a conventional coupler. This method also should duplicate the main optical train better.

Figure 2A:
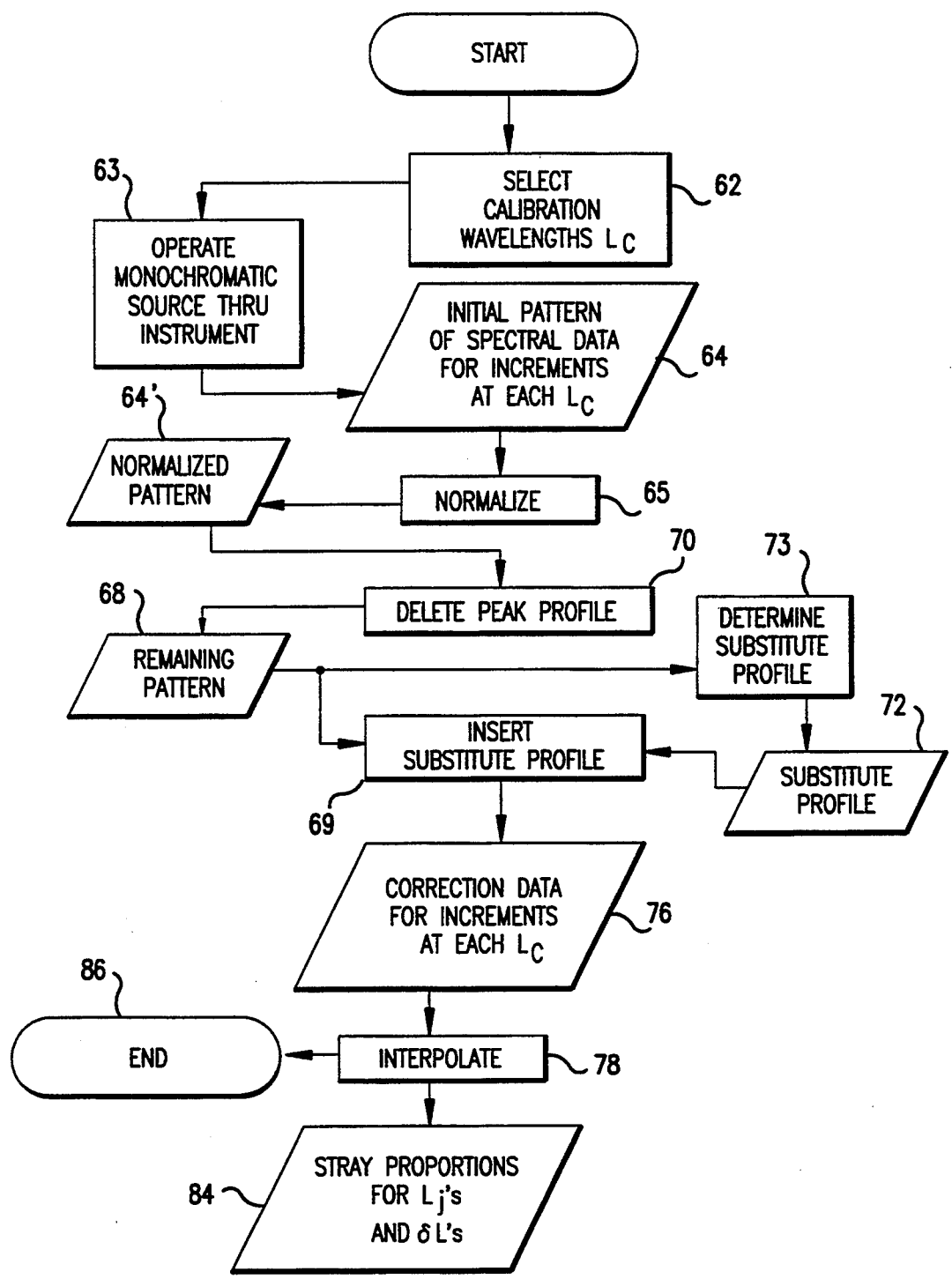
FIGS. 2A and 2B are flow diagrams of a method and means for carry out the invention.
Figure 2B:
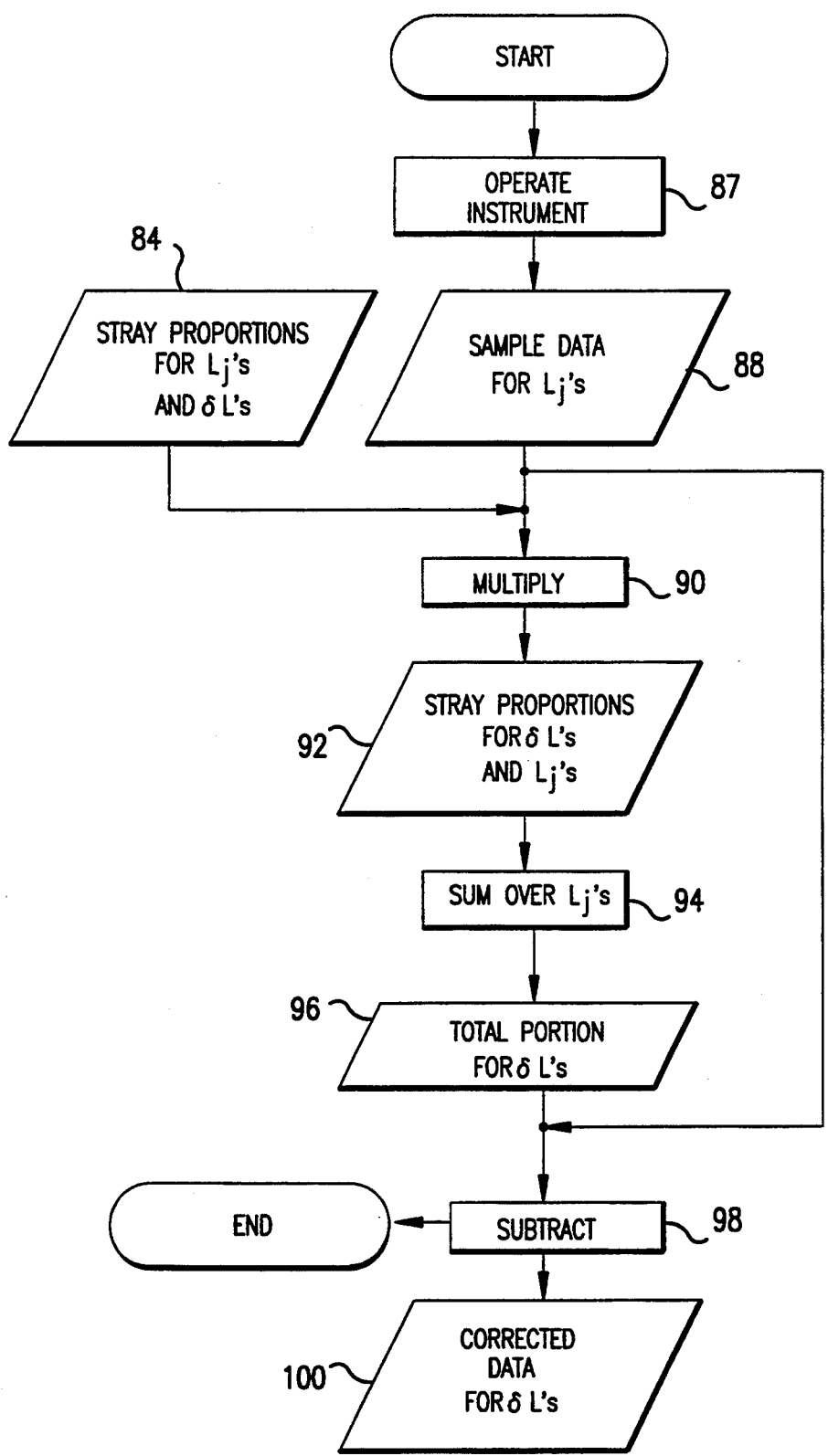

FIGS. 2A and 2B show flow diagrams of the sequential means for carrying out the invention with computer 36. Computations include approximations. The programming means for carrying out computations of the invention are conveniently and readily achieved with a conventional computer language such as "C" generally available through the supplier of the operating system utilized with the computer. The overall program may be compiled, for example, on a Digital Equipment Corporation Model 466 computer that may be associated with the instrument. Such program is incorporated advantageously into the master program that is utilized in the operation of the instrument and the processing of spectral data therein.

A plurality of calibration wavelengths distributed across the spectral range is preselected 62. The number of such wavelengths may be equal to the number of wavelength increments (pixels), i.e. 1024, and the calibration wavelengths may even coincide with the ordered wavelengths, but this is likely to require an excessive number of calibration runs. It is more practical, and sufficiently accurate, to utilize fewer than half as many, such as 151 calibration wavelengths, and then interpolate the results. In general the number should be as small as practical but sufficiently large to capture any important spectral structures in the instrument profile.

The monochromatic source 48 (FIG. 1) is operated 63 cooperatively with the instrument 10 to provide the calibration wavelengths as indicated above. For each preselected calibration wavelength, radiation 50 (FIG. 1) having this wavelength is directed into the wavelength analyzer 26 so as to effect an initial pattern 64 of spectral data for all of the wavelength increments across a selected spectral range (usually the instrument range). This pattern (FIG. 3A) will have a peak profile 66 at the calibration wavelength $L_C$. The remainder of the pattern 68 away from the peak profile represents further radiation at the calibration wavelength (although detected by pixels not positioned at that wavelength), and such remainder is representative of stray radiation.

Figure 3A:
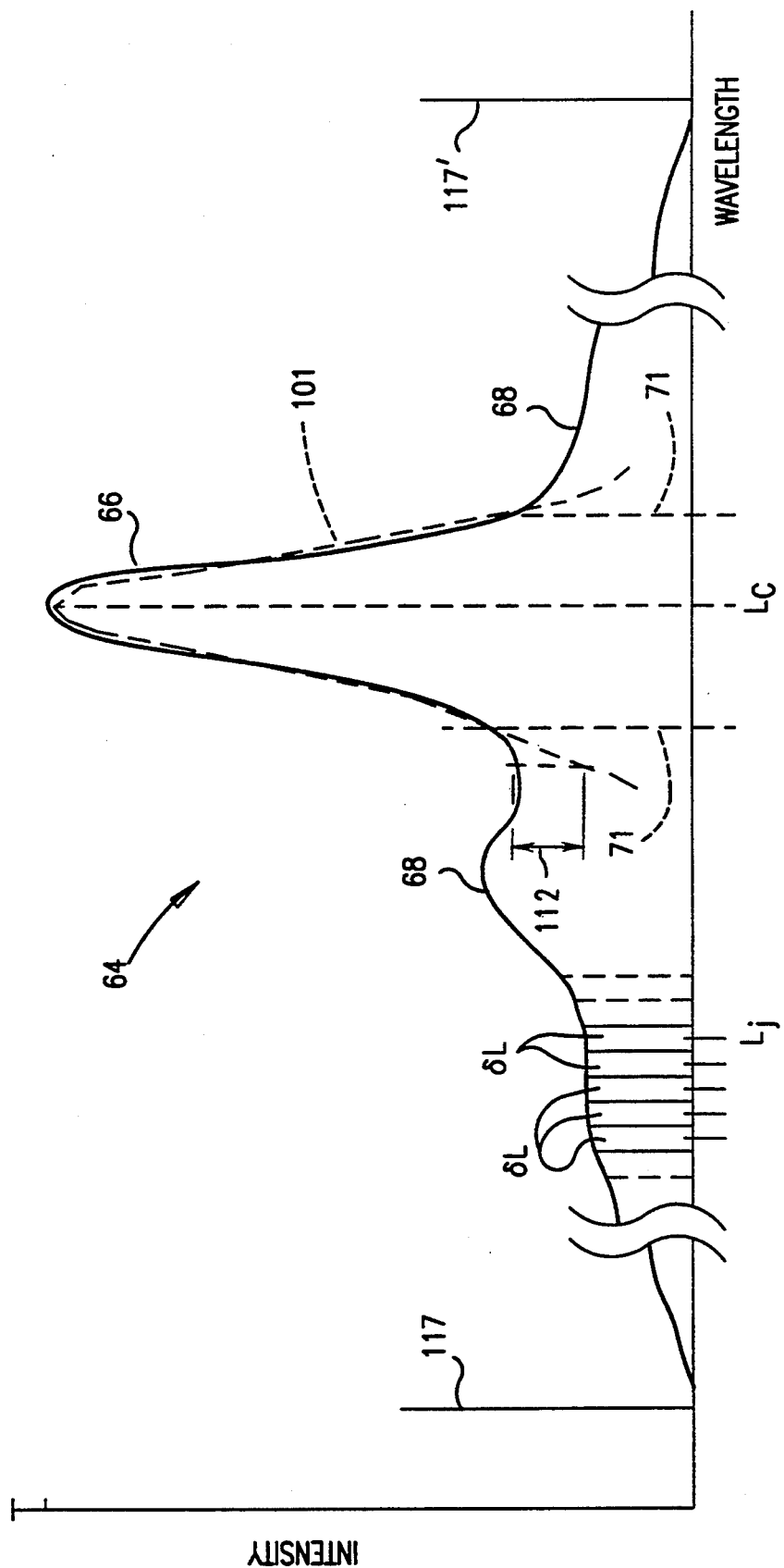
Figure 3B:
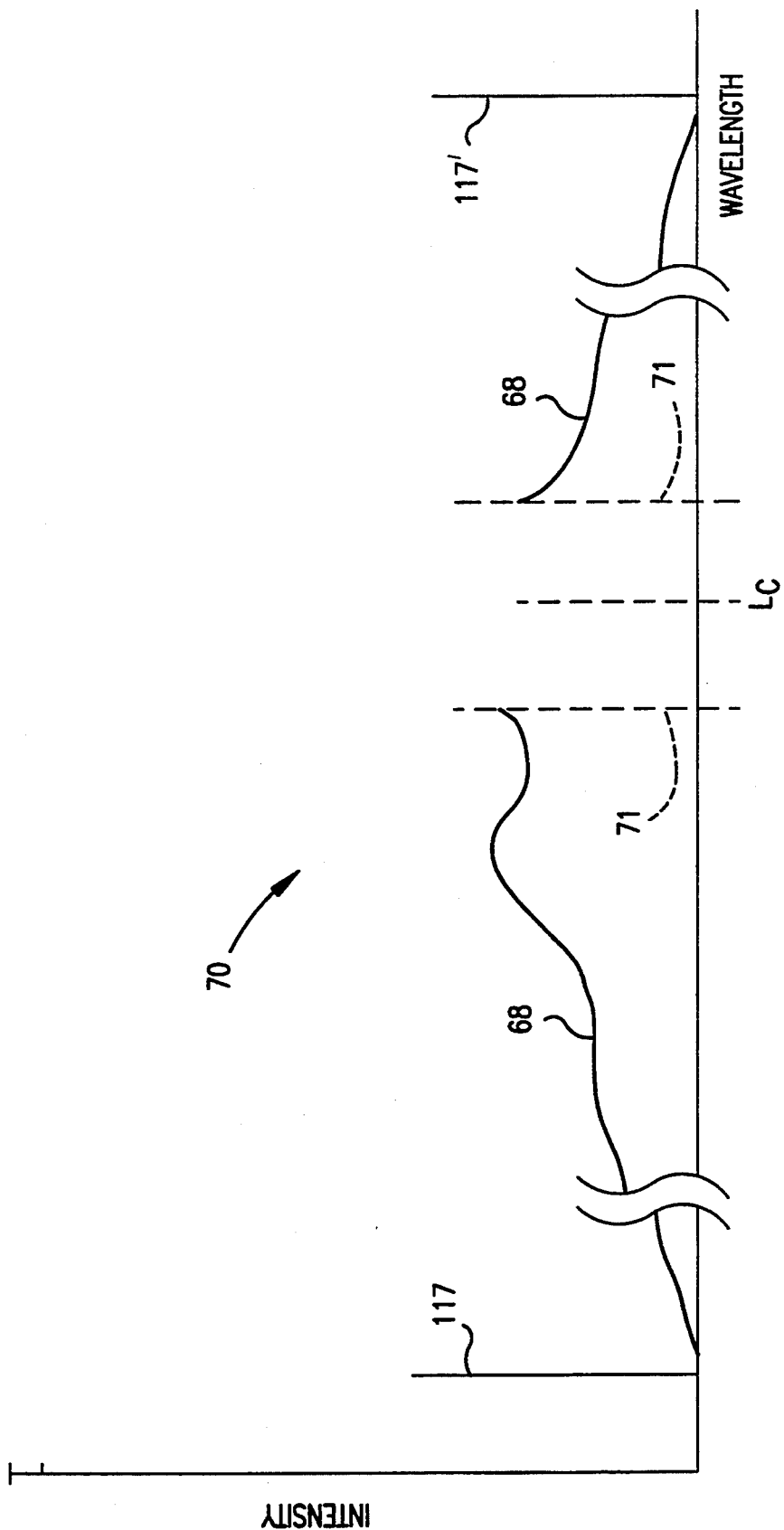

The stray data, for each wavelength increment (receptor), is first normalized 65 to effect a normalized pattern 64' that includes a normalized peak profile. (FIGS. 3A, 3B and 3C are also representative of normalized data.) Normalizing is defined and effected in the usual manner, being the data value for each ordered wavelength divided by the integration or total of all such data values in the stray data set for the calibration wavelength, said total being the sum for all increments across of the spectral range, generally the total radiation. Such integrated or summed total is the area under a curve representing the stray data. A normalization factor is the reciprocal of the area.

As the normalized peak profile 66 is formed primarily of direct (not stray) radiation, this peak is deleted 70 from the normalized pattern between selected cutoff wavelengths 71 to effect the remaining pattern 68 (FIG. 3B). A substitute profile 72 (FIG. 3C) to replace the peak is determined 73 and inserted 69 into the remaining pattern 68 at a level based on the remaining pattern, the substitute being significantly lower than the original peak. The exact form or level of the substitute is not critical. One example of the substitute is a straight line at about the average level of the two portions 75 of remaining pattern that are adjacent to the peak profile on both sides thereof. A preferred determination of a substitute profile is described herein below.

The result after the substitution is a pattern 74 (FIG. 3C) of correction data 76 representative of stray radiation, there being a separate similar pattern for each calibration wavelength. Correction data representative of stray radiation for each calibration wavelength is determined across the wavelength increments of the spectral range. At this stage it is useful to recognize these wavelength increments as having a function as receptor increments of stray radiation. By reorganizing the data (at least conceptually), it may be seen that each receptor increment has an associated set of correction data for the various calibration wavelengths. The correction data may consist of polynomial parameters as explained later herein.

If the calibration wavelengths coincide with the wavelength increments (e.g. for 1024 pixels), the next step of interpolation 78 is deemed to have been accomplished. For a lessor number of calibration wavelengths, actual interpolation is effected. Also, calibration wavelengths generally will not be exactly the same as the ordered wavelengths corresponding to the wavelength increments, further necessitating interpolation. It is further useful to recognize the ordered wavelengths as representing source wavelengths of stray radiation that is scattered to each of the wavelength increments functioning as receptor increments receiving the stray.

For each wavelength increment (receptor), the set of correction data is interpolated 78 to the ordered wavelengths (sources). This effects a set of stray proportions of radiation 84 identified to the wavelength increment (receptor) ($\delta L$) and to respective ordered wavelengths (sources) ($L_j$). Interpolation values may be estimated or simply an adoption of adjacent values; however, with computer programming, more direct methods are convenient and more accurate.

The data for the stray proportions 84 may be stored as a full matrix set of data values equal in number to the square of the number of wavelength increments, e.g. $1024 \times 1024$ (without end effects discussed below). However, it is advantageous to curve-fit the data and store only the curve parameters, as illustrated below.

This completes 86 the calibration for stray radiation, and the monochromatic source is removed or switched from the instrument. The stray proportion values (or equivalent parameters therefor) are preferably stored to be available for future correction of sample spectra on a real time basis. Recalibration is not necessary unless there is reason to believe a change has occurred in the instrument, for example, a change in the dispersion grating or a baffle or any other surface that may change stray light to the detector.

During a sample run (FIG. 2B), the spectrophotometer is operated 87 with radiation from its normal source through a sample (which for the present purpose may be an actual sample, a standard or a run without an actual sample) to effect spectral sample data 88 (preferably corrected for background) for each ordered wavelength across the spectral range. For each wavelength increment, considering the corresponding ordered wavelength as a source wavelength, corresponding sample data 88 are multiplied 90 by each stray proportion 84 identified to the ordered wavelength to effect stray portions 92 of the actual radiation coming from the source wavelength and scattered to other wavelength increments. The stray portion is thus identified to the ordered wavelength and to the wavelength increments across the spectral range. With reorganization of the data (at least conceptually), each wavelength increment has an associated set of stray portions.

For each wavelength increment (receptor), all stray portions in the set are summed 94 over the ordered wavelengths (sources) to effect a total portion 96 of stray radiation scattered to the wavelength increment. In matrix algebra this result is a vector that is a dot product of the stray proportion matrix and the sample data vector. The total portion of stray radiation is subtracted 98 from the sample data for the source increment to effect corrected data for each wavelength increment. The corrected data 100 for all of the increments (pixels) across the spectral range are thereby representative of a spectrum of the sample radiation corrected for stray radiation.

The stray correction should also be applied to standard runs or runs without the sample, after the ordinary dark or background correction to each. The corrected intensities with and without sample (or with sample and standard) are then ratioed conventionally to obtain relative transmittance values for the wavelength increments (pixels) across the spectral range.

Figure 4A:
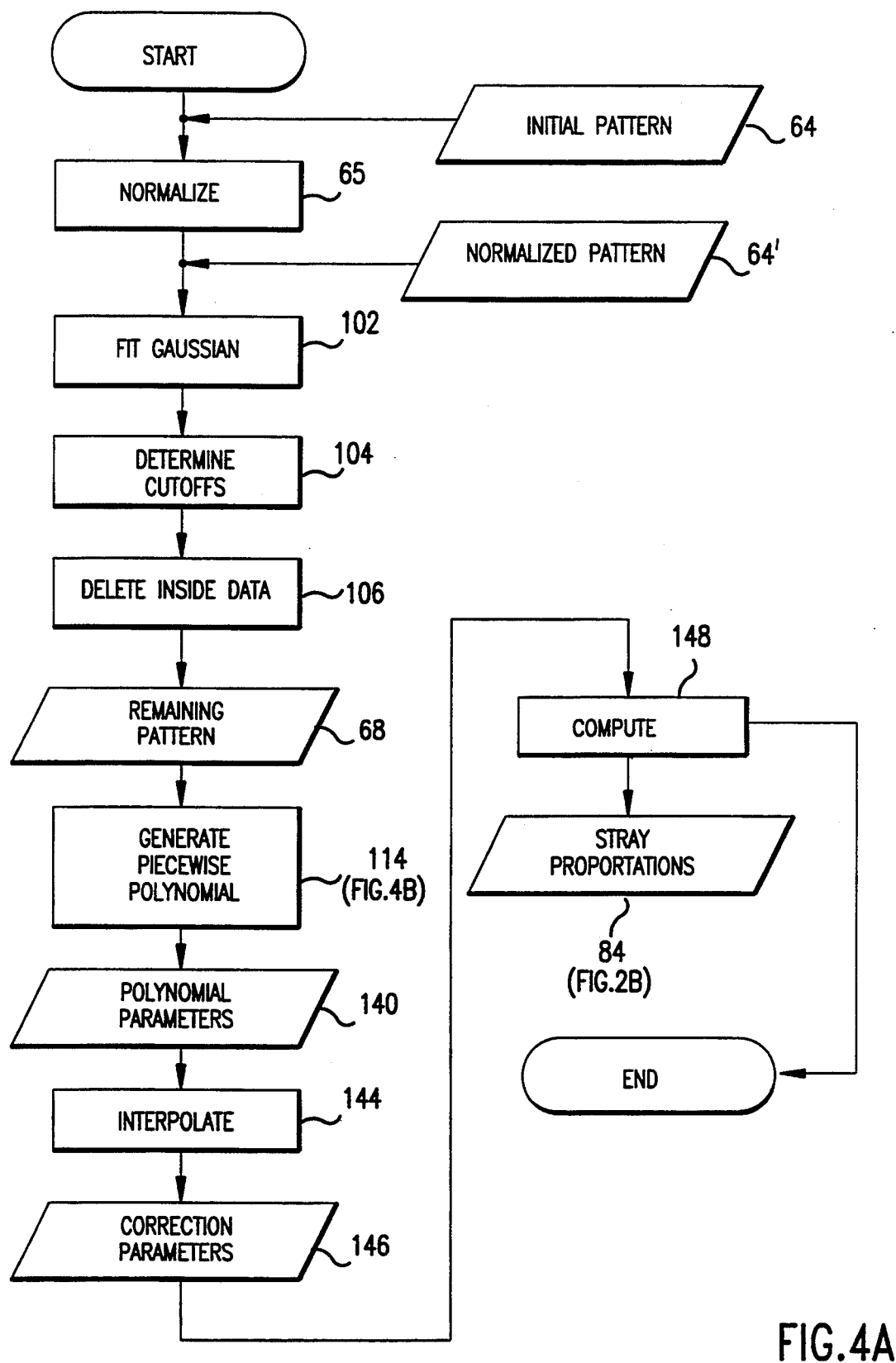
FIGS. 4A and 4B are flow diagrams showing a preferred method and means for carrying out the invention.
Figure 4B:
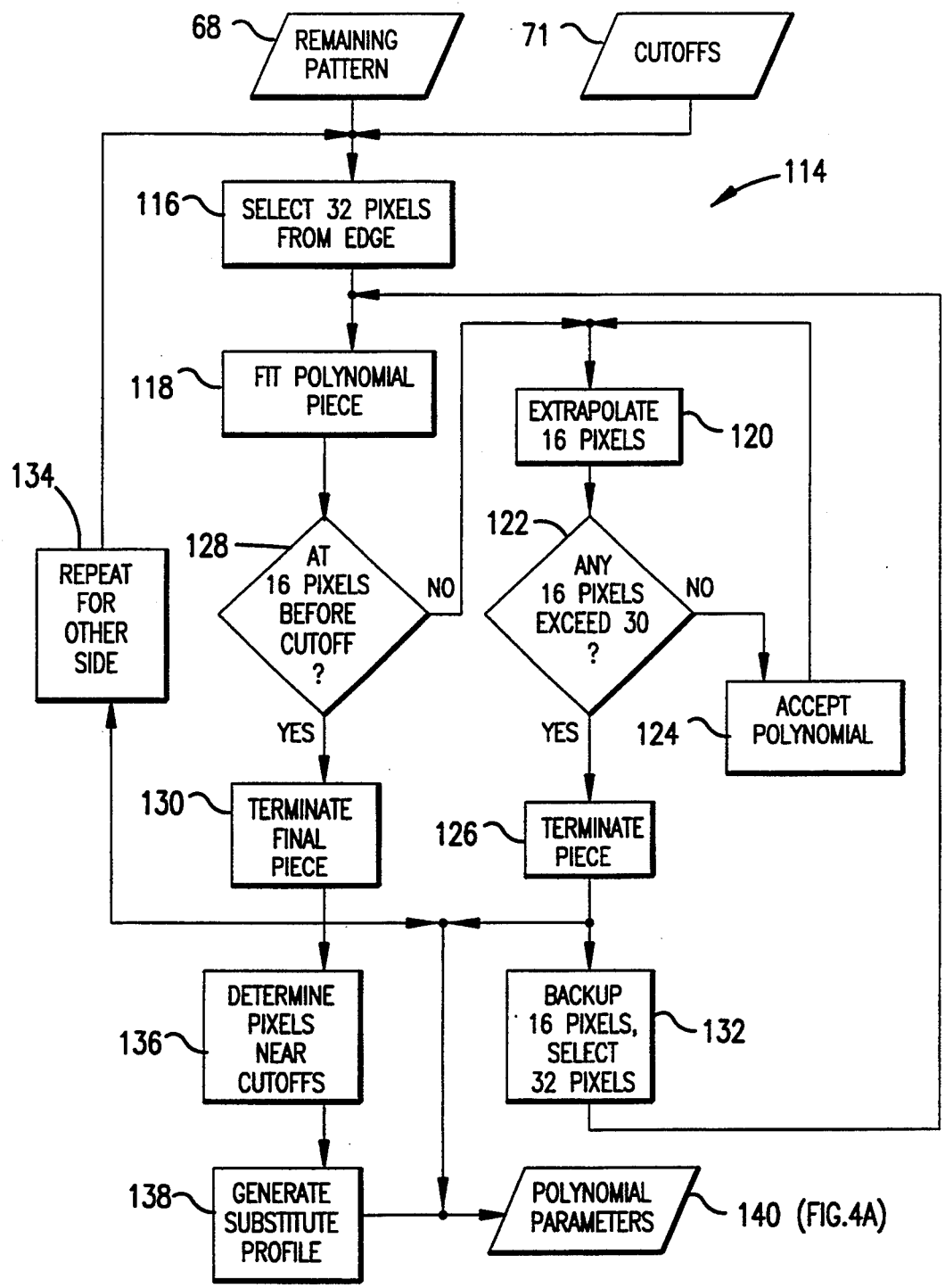

FIGS. 4A and 4B (along with FIG. 3A) show an example of a preferred procedure and means for carrying out computations for the foregoing calibration for an initial pattern (from which background has been subtracted) for monochromatic radiation. The peak profile centers at the wavelength $L_C$ of the monochromatic radiation. The initial pattern 64 is normalized 65 to a normalized pattern 64' as explained for FIG. 2B. A Gaussian peak 101 is fitted 102 by least squares to the normalized pattern for the full spectral range. More generally any peak type of curve such as a parabola may be utilized, but Gaussian is particularly suitable. Cutoffs 71 are determined 104 at a point on each side of the Gaussian peak where the differences (for example, difference 112, FIG. 3A) between the data and the fitted curve exceed a preselected limit such as three times a root-mean-square noise level. Data inside of the cutoffs are deleted 106 to effect the remaining pattern 68 (also FIG. 3B).

A polynomial curve is generated 114 in a convention manner with the spectral data of the remaining pattern 68, as follows: A "piecewise" third-order polynomial curve is advantageous (FIG. 4B). For the first piece, data for the first 32 pixels (wavelength increments) are selected 116 from one edge 177 (FIG. 3A) of the spectral range to generate a polynomial fit 118 which is extrapolated 120 16 pixels more and compared 122 with corresponding pixel data. If all errors in the extrapolated range are within a predetermined limit, e.g. three times the standard deviation of errors in the first range, then the polynomial piece is accepted 124 for the $32 + 16 = 48$ pixel range. This polynomial piece is repeatedly extrapolated 120 another 16 pixels until an error exceeds the three-times limit, in which case this polynomial is terminated 126 before the last extrapolation. The polynomial is terminated 130 earlier if it reaches 128 a point 16 pixels before the cutoff 71 (FIG. 3A) at the deleted peak profile.

If the polynomial is terminated 126 by the error determination 122, a new start for the next piece is taken from a point backed up 16 pixels from the termination, and data for 32 pixels from the new start 132 generate a new polynomial fit 118 which is extrapolated and compared in the same manner as the first piece. This next piece is continued until it, too, is terminated by an error determination, or until it first reaches the point 16 pixels before the cutoff for the peak profile. If the new polynomial is terminated by the error determination, the procedure is repeated again with one or more further polynomials until the point before cutoff is reached 130. The successive pieces 113 (FIG. 3C) of polynomial are bounded by the starting edge 177, the intermediate termination points 115 and a cutoff 71. The entire procedure is repeated 134 to generate a piecewise polynomial section on the other side of the masked peak profile.

The last piece of polynomial, namely the substitute profile 72, is then generated 138 for data from pixels located 136 in the vicinity of the cutoffs 71. This is advantageously determined from nearby pixels, e.g. 16 pixels on the outside of each cutoff, i.e. a total of 32 pixels. The piece of polynomial between the two cutoffs constitutes the substitute profile 72 (FIG. 3C). The actual number of pixels used to determine the substitute profile is preferably as small as possible, so as to retain only those proximate the cutoffs, while retaining a statistically significant number. A useful guideline is to use about double the same number on either side of a cutoff as the number of pixels of spread due to the band pass of the system (8 in the present example). At this point a set of piecewise, normalized, polynomial parameters 140 has been generated.

The total number of pieces of polynomial on both sides will depend on the instrument and the nature of the stray radiation therein. In the present instance, it has been found that 10 pieces of polynomial are developed resulting in 40 parameters (instead of 1024) for each of the 151 calibration wavelengths. However, such set of 40 parameters is needed for each of the pixels (1024 wavelength increments). Therefore, these normalized parameters 140 are interpolated 144 (FIG. 4A) to the corresponding wavelengths of the increments (pixels) from those for the calibration wavelengths by any conventional method such as cubic spline. Normalized correction parameters 146 for the wavelength increments are thereby determined, representing the stray proportions 84 which are further computed 148.

Use of such parameters has a further advantage of smoothing the data to substantially eliminate noise. In the computer programming for computation and storing of the parameters, except for amount of stored information and the speed of applying corrections in real time, it is a matter of choice not important to the end result whether only the parameters for the calibration wavelengths are stored and the interpolated values computed when put into use, or alternatively whether the interpolated values are all computed and stored for future use. Storage of interpolated values is preferable for faster real-time computations, as described later herein.

Figure 5:
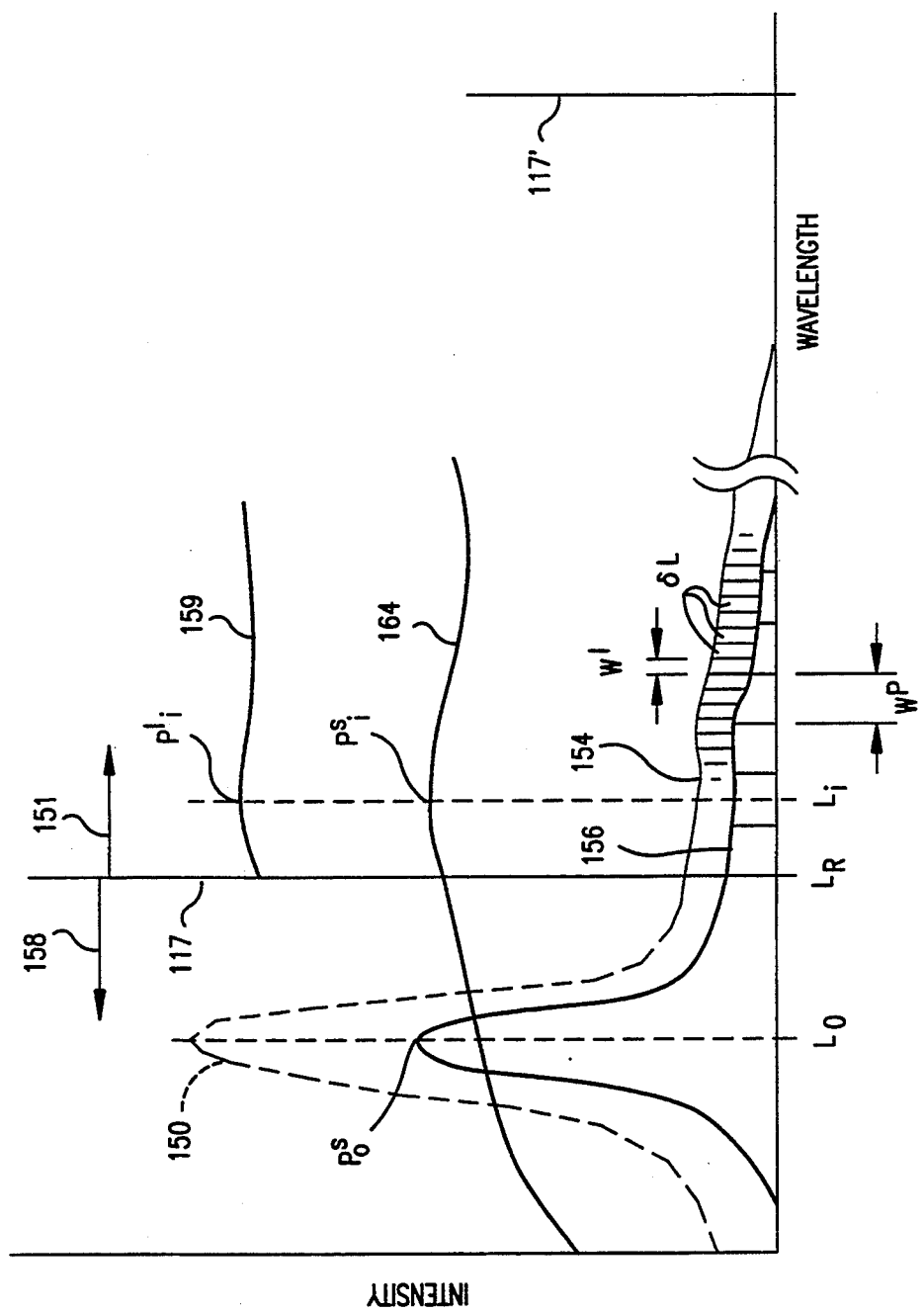
FIG. 5 shows spectral profiles and peaks near a spectral range limit.

The foregoing steps and means provide a direct calibration for stray radiation having wavelengths within the spectral range for the instrument. A refinement may be necessary or desirable for stray radiation originating outside of this range. This may occur above and/or below the instrument range to the extent that cutoff filters are incomplete outside the range. FIG. 5 shows an example for a low wavelength end of the limited spectral range, where a peak profile 150 from monochromatic light below the range limit 117 ($L_R$) is not detected by the wavelength analyzer, although the stray radiation 154 of this low wavelength is detected in the analyzer wavelength range. Although only the stray data above the limit is needed directly, true normalization cannot be effected without the full curve. This can be solved by estimating a normalization factor for correction data based at least in part on correction data within the range limit. One approach is to utilize or extrapolate a normalization factor from one or more such sets of calibration radiation data that are within the limit.

A more accurate normalization involves generating further spectral data with the monochromatic source at one or more calibration wavelengths in each of the one or two extended spectral regions outside of the instrument spectral range limits, e.g. extending 293 ordered wavelengths below the range and 146 above it. A normalized factor is determined by making separate measurements with a substitute wavelength analyzer 152 (FIG. 1) that is calibrated by wavelength relative to the wavelength analyzer of the spectrometric instrument. The substitute need not be as accurate as the spectrometric instrument, but has a broader spectral range to encompass at least a relevant portion of that of the instrument plus the extended range(s). The encompassing should substantially include the extended pattern of spectral data explained below. A single scanning monochromator Model 77250 of Oriel Corp., Stanford, Conn. is suitable for the substitute. Radiation from the double monochromator 48 is directed to the substitute analyzer 152 via the fiber 51 and a fiber 155, for example through switch 46 as shown. However, as indicated above, it is advantageous to connect these fibers directly together by means of a conventional coupler, bypassing a switch.

Figure 6:
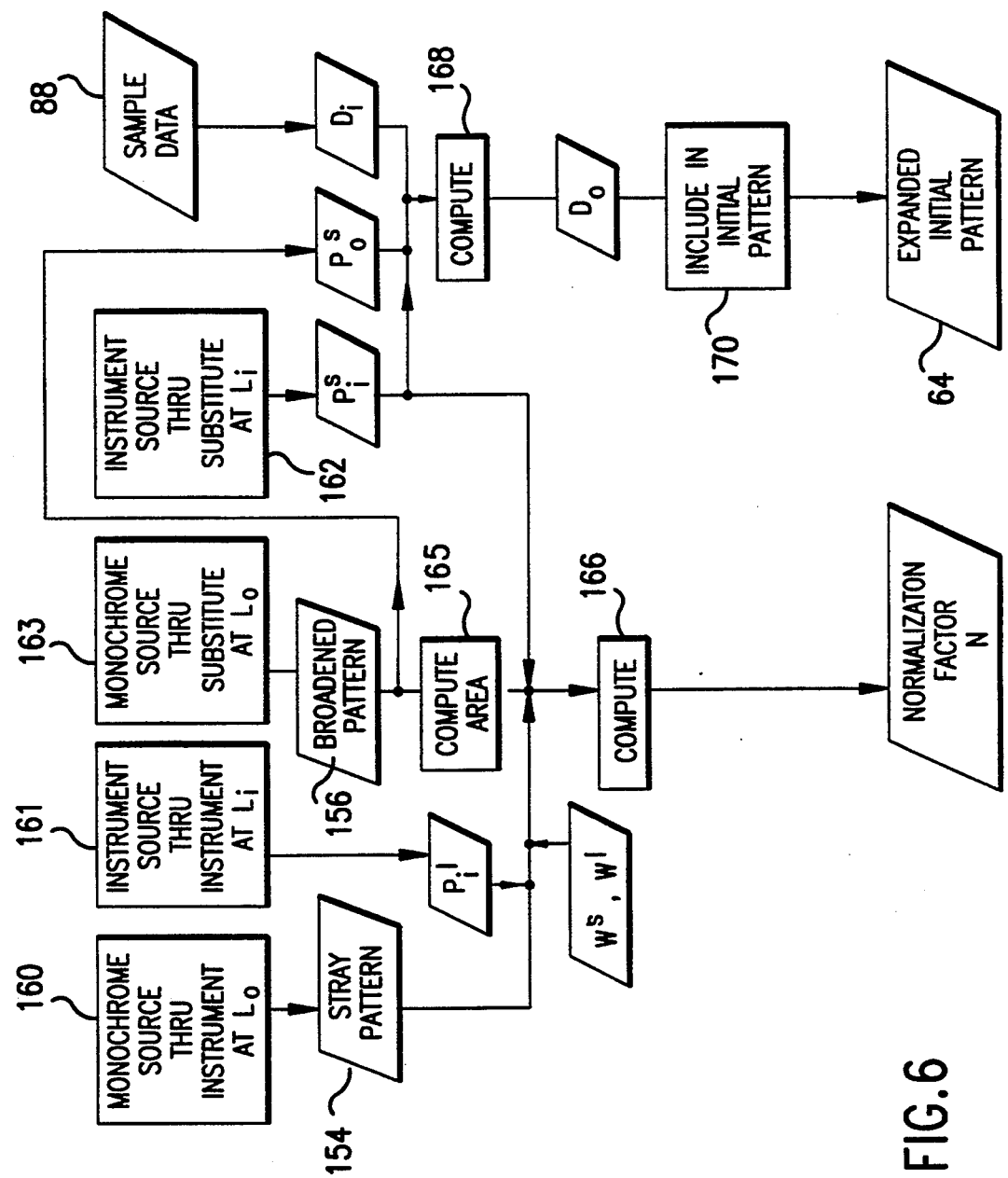
FIG. 6 is a flow diagram of a method and means for a further aspect of the invention.

At least one additional calibration wavelength $L_O$ is selected in an extended range 158 (FIG. 5) outside of the limited spectral range 151 but generally near the range limit, for example at 790 nm where the lower limit $L_R$ is 800 nm. In a set of runs 160 (FIG. 6) with the instrument wavelength analyzer, substantially monochromatic radiation is directed from the monochromatic source 48 at the outside wavelength $L_O$ to the wavelength analyzer so as to effect a stray pattern 54 of spectral data for the wavelength increments $\delta L$'s. This stray pattern is representative of stray radiation within the limited range (between 117 and 117' in FIG. 3C) and is included as added data in the set of correction data.

A further wavelength $L_i$ is selected inside of the limited range but proximate the range limit $L_R$. Such proximate wavelength may be, for example, 805 nm where the lower limit of the spectral range is 800 nm. Radiation from the source 14 (FIG. 1) of the instrument is measured 161 at the proximate wavelength $L_i$ by the wavelength analyzer 26 of the instrument so as to effect a profile 159 with first data value $P^I_i$ at the proximate wavelength. In a further run 162, the same radiation is also directed from source 14 to the substitute wavelength analyzer 152 so as to effect a profile 164 (FIG. 5) with a second data value $P^S_i$ at the proximate wavelength. (The superscript "I" refers to instrument data, and "S" refers to substitute analyzer data.)

The substantially monochromatic radiation at the outside calibration wavelength $L_O$ is also directed 163 into the substitute analyzer so as to effect a broadened pattern 156 of spectral data in the extended spectral range 158 and at least a portion of the limited range 151. This extended pattern is integrated, for example by totalling all individual values, so as to compute 165 the area of a curve representing the pattern, the reciprocal of the area being a normalization factor $N^S$ for that curve.

The normalization factor N for the stray pattern from the outside wavelength is estimated by a computation 166 from an equation $N = (W^I * P^S_i * N^S)/(W^S * P^I_i)$, where $W^I$ is the wavelength width for the wavelength increments (pixels) of the instrument, and $W^S$ is the width of the wavelength steps intrinsic to the substitute analyzer. It is assumed that this equation holds when the calibration wavelength is outside of the wavelength range of the instrument. Thus the stray data 154 can be normalized with the same factor N to effect the stray proportions, or the equivalent parameters thereof, in the spectral range 153 of the instrument by using calibration wavelengths to account for stray radiation originating outside of but proximate to this range.

A further approximation is made for the step of effecting the stray portions of radiation from actual sample data, wherein as previously indicated, sample data for each ordered wavelength is multiplied by the stray proportions to effect stray portions of radiation identified to the ordered wavelength and the wavelength increments. Such approximation is needed because no sample data is directly available outside the instrument range to multiply by the stray proportions originating outside the range.

A further estimate (FIG. 6) for a sample data run 88 utilizes the above-described second data value $P^S{}_i$ taken with the substitute analyzer at the inside wavelength $L_i$, and a third peak value $P^S{}_o$ measured 163 by the substitute analyzer for the monochromatic radiation at the selected calibration wavelength $L_o$ outside of the range limit. The third peak value is part of or readily derived from the broadened pattern 156 of spectral data. Then an outside sample data value $D_o$ for the spectrometric instrument representing a hypothetical intensity at the calibration wavelength outside the range limit may be computed 168 from an approximate equation $D_o = D_i * P^S{}_o / P^S{}_i$ where $D_i$ is the sample data value for the inside proximate wavelength $L_i$. This additional value is included 170 into the spectral sample data 64 for use in determining the stray portions as described herein above.

If necessary a plurality of such additional sample values are obtained for a corresponding plurality of ordered wavelengths extending outside of the spectral range limit as far as necessary to account for significant stray radiation scattered from outside wavelengths into the pixels for the limited spectral range. In the instrument of the present example, the range may extend down to 700 nm where the lower instrument limit is 800 nm, and up to 1150 nm where the upper instrument limit is 1100 nm. Extensions of the ordered wavelengths to be interpolated are included with the ordered wavelengths and, also, the one or more outside calibration wavelengths are included with the originally selected calibration wavelengths for the purpose of determining stray portions of radiation in the limited range.

Monochromatic radiation is directed to the substitute analyzer at each of the plurality of extended wavelengths so as to effect the plurality of third peak values for the extended ordered wavelengths. The corresponding plurality of outside sample data values are computed from the above equation for $D_o$. Interpolations are applied as needed to adjust these values to the set of extended ordered wavelengths.

The outside sample data values are all included with the spectral sample data in the step of multiplying such data by the stray proportions identified to an ordered wavelength (including an extended ordered wavelength) to effect stray portions further identified to the wavelength increments inside the limited spectral range. The next steps of summing and subtracting are effected as in the basic aspects of the invention.

As indicated above, polynomial parameters may be stored for producing the stray proportions in real time to apply to sample data to yield the stray portions. An alternative is to store the matrix of stray proportions. In either case, the computation time on the sample data may be significant. The basic matrix of stray proportions is, for the present example, $1024 \times 1463$ where the 1463 is 1024 expanded by the $293 + 146$ interpolated increments for calibrations outside of the instrument range. This may be reduced to a $1024 \times 1024$ matrix by summing the first 293 and last 146 columns of the matrix, but a large number of computations is still required.

To reduce computation time, according to a further aspect of the invention, the matrix of stray proportions is reduced further for application to only a selected portion of the pixel data distributed across the spectral range, for example every eighth pixel (ordered wavelength). Interpolation by the Lagrange method or the like then approximates the values for the stray portions for the pixels between the selected pixels. Polynomial coefficients representing the stray proportions are used in place of the actual proportions, and all computations leading to the reduced new matrix are performed initially (e.g. at the factory). The reduced matrix is then stored and applied to the fraction of data in real time to produce polynomial coefficients of stray portions, and the stray portions are calculated from these.

In matrix notation, the basic computation for a vector S of total stray portions is $S = M \cdot P$, where M is the $1024 \times 1024$ primary matrix of stray proportions, and P is the vector of sample data. (The matrix multiplication combines the steps of multiplying sample data by each stray proportion and summing stray portions.) The vector Pc for corrected data is $Pc = P - S$. If $Q_{128,1}$ is a reduced data vector of sample data for 128 selected pixels (every eighth), $L_{1024,128}$ is a matrix ("L matrix") for interpolation, and $P_{1024,1}$ is an approximation of the sample data vector for purposes of computing an approximation for S, then $P_{1024,1} = L_{1024,128} \cdot Q_{128,1}$ A new matrix ("N matrix") is defined by $N_{1024,128} = M_{1024,1024} \cdot L_{1024,128}$, so that the approximation for S is $S_{1024,1} = N_{1024,128} \cdot Q_{128,1}$.

A Lagrange transformation is suitable for deriving the L matrix by establishing weight coefficients with polynomials. For example linear coefficients may be established for interpolating between pairs of selected pixels. A second (or higher) order polynomial uses data for three (or more) successive pixels for each group of interpolations. For second order, for example, a group may consist of the center pixel, the four pixels below it and the three pixels above it. The next group is similarly centered on the next pixel. A resulting L matrix is shown below, where a1 ... c8 is a repeating submatrix, and q1 ... u3 is an end matrix at each end. The $8 \times 3$ submatrix a1 ... c8 consists of the Lagrange interpolation coefficients for the eight interporated values in the center of the range defined by the three interpolation points (i.e. the three adjacent matrix values). The $5 \times 3$ end matrix values are the Lagrange interpolation values at the beginning and end of the range defined by three interpolation points.

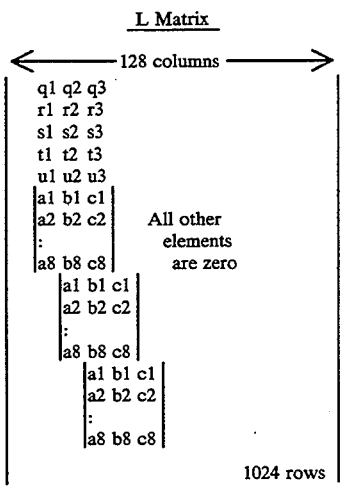

L Matrix

The benefit is that the number of columns in the N matrix is ⅛ that of the M matrix. This reduces the amount of real time calculation eightfold. Another eightfold reduction is achieved by using the coefficients of the piecewise polynomial representation of the stray proportions rather than the stray proportions themselves. This reduces the number of rows in the M and N matrices from 1024 to 128. Tables 1 and 2 give matrix values for the present example.

TABLE 1

|   | 1 | 2 | 3 |
|---|---|---|---|
| q | 1.0000 | 0 | 0 |
| r | 0.8203 | 0.2344 | −0.0547 |
| s | 0.6563 | 0.4375 | −0.0939 |
| t | 0.5078 | 0.6094 | −0.1172 |
| u | 0.3750 | 0.7500 | −0.1250 |

TABLE 2

|   | a | b | c |
|---|---|---|---|
| 1 | 0.2578 | 0.8594 | −0.1172 |
| 2 | 0.1563 | 0.9375 | −0.0938 |
| 3 | 0.0703 | 0.9844 | −0.0547 |
| 4 | 0 | 1.0000 | 0 |
| 5 | −0.0547 | 0.9844 | 0.0703 |
| 6 | −0.0938 | 0.9375 | 0.1563 |
| 7 | −0.1172 | 0.8594 | 0.2578 |
| 8 | −0.1250 | 0.7500 | 0.3750 |

While the invention has been described above in detail with reference to specific embodiments, various changes and modifications which fall within the spirit of the invention and scope of the appended claims will become apparent to those skilled in this art. The invention is therefore only intended to be limited by the appended claims or their equivalents.

We claim:

1. A method of correcting for stray radiation in a spectrum generated by a spectrometric instrument that includes a wavelength analyzer for effecting spectral data representative of spectral intensities in wavelength increments at ordered wavelengths across a spectral range, the method comprising:

selecting a plurality of calibration wavelengths distributed across the spectral range;

for each calibration wavelength:

directing substantially monochromatic radiation at the calibration wavelength to the analyzer so as to effect an initial pattern of spectral data for the wavelength increments, the initial pattern having a peak profile at the calibration wavelength and being representative of stray radiation away from the peak profile;

normalizing the initial pattern to effect a normalized pattern having a normalized peak profile;

deleting the normalized peak profile from the normalized pattern to effect a remaining pattern; and substituting for the normalized peak profile a substitute profile based on the remaining pattern so as to effect a pattern of correction data representative of stray radiation, the correction data being identified to the calibration wavelength and respectively to the wavelength increments, whereby each wavelength increment has an associated set of correction data for the calibration wavelengths;

for each wavelength increment, interpolating the set of correction data from the calibration wavelengths to the ordered wavelengths to effect stray proportions of radiation identified to the wavelength increment and respectively to the ordered wavelengths, whereby the ordered wavelengths represent source wavelengths, the wavelength increments function as receptor increments, and each ordered wavelength has an associated set of stray proportions identified thereto and respectively to the wavelength increments;

operating the spectrometric instrument with radiation from a sample source to effect spectral sample data for the wavelength increments and correspondingly for the ordered wavelengths;

for each ordered wavelength, multiplying corresponding sample data by each stray proportion identified to the ordered wavelength to effect stray portions of radiation identified to the ordered wavelength and respectively to the wavelength increments, whereby each wavelength increment has an associated set of stray portions identified thereto; and for each wavelength increment:

summing the stray portions identified to the wavelength increment to effect a total portion of stray radiation for the wavelength increment; and subtracting the total portion from the sample data to effect corrected data for the wavelength increment;

whereby a set of corrected data effected for the wavelength increments is representative of a spectrum of the sample radiation corrected for stray radiation.

2. The method of claim 1 wherein the wavelength analyzer includes a detector having an array of photoreceptive pixels corresponding to the wavelength increments.

3. The method of claim 1 further comprising storing the stray proportions, and wherein the steps of multiplying, summing and subtracting are effected on a real-time basis.

4. The method of claim 1 wherein the spectrometric instrument includes a first optical fiber system for directing radiation from the sample source to the wavelength analyzer, the first fiber system having a core diameter and a numerical aperture, and the step of directing comprises directing the substantially monochromatic radiation to the analyzer by way of a second optical fiber system having substantially the same core diameter and numerical aperture as the first fiber system.

5. The method of claim 1 wherein the ordered wavelengths have a predetermined number thereof across the spectral range, and the selected plurality of wavelengths is less than the predetermined number.

6. The method of claim 5 wherein the selected plurality of wavelengths is less than half of the predetermined number.

7. The method of claim 1 further comprising fitting the spectral data of the initial pattern or the normalized pattern to a peak type of curve, determining a cutoff point on each side of the curve where data error from the curve exceeds a selected limit, and utilizing the cutoff points to delineate, correspondingly, the peak profile or the normalized peak profile therebetween.

8. The method of claim 7 wherein the peak type of curve is a Gaussian curve.

9. The method of claim 1 further comprising fitting the remaining pattern to a polynomial curve representative of the remaining pattern, and fitting spectral data of the remaining pattern proximate the deleted peak profile to a further polynomial representative of the substitute profile, such that polynomial parameters defining the polynomial curve and the further polynomial constitute the correction data for each calibration wavelength, wherein the step of interpolating comprises interpolating the polynomial parameters to the ordered wavelengths, and computing the stray proportions from the interpolated polynomial parameters.

10. The method of claim 9 wherein the polynomial curve comprises piecewise polynomials over respective sections of the remaining pattern.

11. The method of claim 9 wherein the sample data define a data vector, the stray proportions form a primary matrix defined such that a multiplication product of the primary matrix and the data vector effects a primary vector representing the total portion for each ordered wavelength, and the method further comprises selecting a portion of the ordered wavelengths distributed across the spectral range so as to thereby select a corresponding portion of sample data defining a reduced data vector, forming an interpolation matrix for interpolating substitute sample data between the selected fraction of sample data, and effecting a reduced matrix formed as a product of the interpolation matrix and the primary matrix, and the steps of multiplying and summing comprise multiplying the reduced matrix with the reduced data vector to effect a substitute vector representative of the total portion of stray radiation for each wavelength increment.

12. The method of claim 11 further comprising storing the reduced matrix, and wherein the steps of multiplying, summing and subtracting are effected on a real-time basis.

13. The method of claim 1 wherein the spectral range is a limited range with a range limit, and the method further comprises:
selecting at least one calibration wavelength outside of the limited range;
directing substantially monochromatic radiation at the outside wavelength to the wavelength analyzer so as to effect a stray pattern of spectral data for the wavelength increments, the stray pattern being representative of stray radiation of the outside wavelength detected at wavelength increments within the limited range and being included as added data in the set of correction data;
determining a normalization factor for the added data based at least in part on correction data within the limited range; and
utilizing the normalization factor in the step of normalizing so as to normalize the added data, the normalized data being included in the stray proportions.

14. The method of claim 13 wherein the wavelength analyzer includes a source radiation and has a wavelength width ($W^I$) for the wavelength increments, and the step of determining comprises:
providing a substitute wavelength analyzer for effecting spectral data representative of spectral intensities in wavelength steps of width ($W^S$) across a broadened spectral range encompassing at least a portion of the limited range and an extended range outside of the limited range, the encompassing substantially including a broadened pattern of spectral data;
selecting a proximate wavelength inside of the limited range proximate the range limit;
directing the source radiation including the proximate wavelength to the wavelength analyzer of the instrument so as to effect a first value ($P^I_i$) at the proximate wavelength;
directing the source radiation including the proximate wavelength to the substitute wavelength analyzer so as to effect a second value ($P^S_i$) at the proximate wavelength;
directing substantially monochromatic radiation at the outside calibration wavelength to the substitute analyzer so as to effect the broadened pattern of spectral data;
determining a normalization factor ($N^S$) for the broadened pattern; and
computing a normalization factor ($N$) for the stray pattern from an equation $N = W^I * P^S_i * N^S / (W^S * P^I_i)$.

15. The method of claim 14 further comprising directing the substantially monochromatic radiation at the outside calibration wavelength to the substitute analyzer so as to effect a third peak value ($P^S_o$) at the outside calibration wavelength, identifying from the spectral sample data a proximate sample data value ($D_i$) for the selected proximate wavelength, computing an outside sample data value ($D_o$) from an equation $D_o = D_i * P^S_o / P^S_i$ including the outside sample data value in the spectral sample data for the step of multiplying.

16. The method of claim 15 further comprising:
selecting a plurality of wavelengths extended outside the range limit from the ordered wavelengths that are inside the limited range, and, for the steps of interpolating and normalizing to effect stray proportions, including the extended wavelengths with the ordered wavelengths and including the outside calibration wavelength with the calibration wavelengths; and
directing substantially monochromatic radiation to the substitute analyzer at the plurality of ordered wavelengths so as to effect a corresponding plurality of third peak values, computing a corresponding plurality of outside sample data values each from the equation for $D_o$, and including the plurality of outside sample data values in the spectral sample data for the step of multiplying.

17. A method of correcting for stray radiation in a spectrum generated by a spectrometric instrument that includes a wavelength analyzer for effecting spectral data representative of spectral intensities in wavelength increments at ordered wavelengths across a spectral range, the method comprising:

for each ordered wavelength:
directing substantially monochromatic radiation at the ordered wavelength to the analyzer so as to effect an initial pattern of spectral data for the wavelength increments, the initial pattern having a peak profile at the ordered wavelength and being representative of stray radiation away from the peak profile,
normalizing the initial pattern to effect a normalized pattern having a normalized peak profile;
deleting the normalized peak profile from the normalized pattern to effect a remaining pattern; and
substituting for the normalized peak profile a substitute profile based on the remaining pattern so as to effect a pattern of stray proportions representative of stray radiation, the stray proportions being identified to the ordered wavelength and respectively to the wavelength increments, whereby the ordered wavelengths represent source wavelengths, the wavelength increments function as receptor increments, and each ordered wavelength has an associated set of stray proportions identified thereto and respectively to the receptive increments;
operating the spectrometric instrument with radiation from a sample source to effect spectral sample data for the wavelength increments and correspondingly for the ordered wavelengths;
for each ordered wavelength, multiplying corresponding sample data by each stray proportion identified with the ordered wavelength to effect stray portions of radiation identified to the ordered wavelength and respectively to the wavelength increments, whereby each wavelength increment has an associated set of stray portions identified thereto; and
for each such wavelength increment:
summing the stray portions identified to the wavelength increment to effect a total portion of stray radiation for the wavelength increment; and
subtracting the total portion from the sample data to effect corrected data for the wavelength increment;
whereby a set of corrected data effected for all wavelength increments is representative of a spectrum of the sample radiation corrected for stray radiation.

18. An apparatus for generating a spectrum corrected for stray radiation, comprising:
a spectrometric instrument including a wavelength analyzer for effecting spectral data representative of spectral intensities in wavelength increments at ordered wavelengths across a spectral range, the instrument being operable with radiation from a sample source to effect spectral sample data for the wavelength increments and correspondingly for the ordered wavelengths;
a source of monochromatic radiation operably disposed to direct substantially monochromatic radiation to the analyzer at each of a preselected plurality of calibration wavelengths distributed across the spectral range such that, for each calibration wavelength, an initial pattern of spectral data is effected for the wavelength increments, the initial pattern having a peak profile at the calibration wavelength and being representative of stray radiation away from the peak profile;
means for normalizing the initial pattern to effect a normalized pattern having a normalized peak profile;
means for deleting the normalized peak profile from the normalized pattern to effect a remaining pattern for each calibration wavelength;
means for substituting for each normalized peak profile a substitute profile based on the remaining pattern so as to effect a pattern of correction data representative of stray radiation, the correction data being identified to a calibration wavelength and respectively to the wavelength increments, whereby each wavelength increment has an associated set of correction data for the calibration wavelengths;
means for interpolating the set of correction data for each wavelength increment from the calibration wavelengths to the ordered wavelengths to effect stray proportions of radiation identified to the wavelength increment and respectively to the ordered wavelengths, whereby the ordered wavelengths represent
source wavelengths, the wavelength increments function as receptor increments, and each ordered wavelength has an associated set of stray proportions identified thereto and respectively to the wavelength increments;
means for multiplying sample data for each ordered wavelength by each stray proportion identified to the ordered wavelength to effect stray portions of radiation identified to the ordered wavelength and respectively to the wavelength increments, whereby each wavelength increment has an associated set of stray portions identified thereto;
means for summing the stray portions identified to each wavelength increment to effect a total portion of stray radiation for the wavelength increment; and
means for subtracting the total portion for each wavelength increment from corresponding sample data to effect corrected data for each receptor increment, whereby a set of corrected data effected for the wavelength increments is representative of a spectrum of the sample radiation corrected for stray radiation.

19. The apparatus of claim 18 wherein the wavelength analyzer includes a detector having an array of photoreceptive pixels corresponding to the wavelength increments.

20. The apparatus of claim 18 further comprising means for storing the stray proportions, and wherein the means for multiplying, summing and subtracting comprise means for multiplying summing and subtracting on a real-time basis.

21. The apparatus of claim 18 wherein the spectrometric instrument includes a first optical fiber means for directing radiation from the sample source to the wavelength analyzer, the first fiber means having a core diameter and a numerical aperture, and the source of monochromatic radiation comprises a second optical fiber means for directing the substantially monochromatic radiation to the analyzer, the second fiber means having substantially the same core diameter and numerical aperture as the first fiber means.

22. The apparatus of claim 18 wherein the ordered wavelengths have a predetermined number thereof across the spectral range, and the preselected plurality of wavelengths is less than the predetermined number.

23. The apparatus of claim 22 wherein the preselected plurality of wavelengths is less than half of the predetermined number.

24. The apparatus of claim 18 further comprising means for fitting the spectral data of the initial pattern or the normalized pattern to a peak type of curve, means for determining a cutoff point on each side of the curve where data error from the curve exceeds a preselected limit, and means for utilizing the cutoff points to delineate, correspondingly, the peak profile or the normalized peak profile therebetween.

25. The apparatus of claim 24 wherein the peak type of curve is a Gaussian curve.

26. The apparatus of claim 18 further comprising means for fitting the remaining pattern to a polynomial curve representative of the remaining pattern, and means for fitting spectral data of the remaining pattern proximate the deleted peak profile to a further polynomial representative of the substitute profile, such that polynomial parameters defining the polynomial curve and the further polynomial constitute the correction data for each calibration wavelength, wherein the means for interpolating comprises means for interpolating the polynomial parameters to the ordered wavelengths, and further comprises means for computing the stray proportions from the polynomial parameters.

27. The apparatus of claim 26 wherein the polynomial curve comprises piecewise polynomials over respective sections of the remaining pattern.

28. The apparatus of claim 26 wherein the sample data define a data vector, the stray proportions form a primary matrix defined such that a multiplication product of the primary matrix and the data vector effects a primary vector representing the total portion for each ordered wavelength, a portion of the ordered wavelengths distributed across the spectral range is preselected so as to thereby select a corresponding portion of sample data defining a reduced data vector, the apparatus further comprises means for forming an interpolation matrix for interpolating substitute sample data between the selected fraction of sample data, and means for effecting a reduced matrix formed as a product of the interpolation matrix and the primary matrix, and the means for multiplying and summing comprise means for multiplying the reduced matrix with the reduced data vector to effect a substitute vector representative of the total portion of stray radiation for each wavelength increment.

29. The method of claim 28 further comprising means for storing the reduced matrix, and wherein the means for multiplying, summing and subtracting comprise means for multiplying, summing and subtracting on a real-time basis.

30. The apparatus of claim 18 wherein the spectral range is a limited range with a range limit, the preselected plurality of calibration wavelengths includes at least one calibration wavelength outside of the limited range, the source of monochromatic radiation is operable to direct substantially monochromatic radiation at the outside wavelength to the wavelength analyzer so as to effect a stray pattern of spectral data for the wavelength increments, the stray pattern being representative of stray radiation of the outside wavelength detected at wavelength increments within the limited range and being included as added data in the set of correction data, and the apparatus further comprises means for determining a normalization factor for the added data based at least in part on correction data within the limited range and means for utilizing the normalization factor in the step of normalizing so as to normalize the added data, the normalized data being included in the stray proportions.

31. The apparatus of claim 30 wherein the wavelength analyzer further includes a source of radiation and has a wavelength width ($W^I$) for the wavelength increments, a proximate wavelength is preselected as being inside of the limited range proximate the range limit, and the source of radiation is operably disposed to direct source radiation including the proximate wavelength to the wavelength analyzer of the instrument so as to effect a first value ($P^I_i$) at the proximate wavelength, and to direct the source radiation including the proximate wavelength to the substitute wavelength analyzer so as to effect a second value ($P^S_i$) at the proximate wavelength, and the source of monochromatic radiation is further operably disposed to direct substantially monochromatic radiation at the outside calibration wavelength to the substitute analyzer so as to effect the projected pattern of spectral data;

the apparatus further comprises a substitute wavelength analyzer for effecting spectral data representative of spectral intensities in wavelength steps of width ($W^S$) across a broadened spectral range encompassing at least a portion of the limited range and an extended range outside of the limited range, the encompassing substantially including a broadened pattern of spectral data and the means for determining a normalization factor ($N^S$) for the broadened pattern; and means for computing a normalization factor (N) for the stray pattern from an equation $N=(W^I*P^S_i*N^S)/(W^S*P^I_i)$.

32. The apparatus of claim 31 wherein the source of monochromatic radiation is further operably disposed to direct the substantially monochromatic radiation at she outside calibration wavelength to the substitute analyzer so as to effect a third peak value ($P^S_o$) at the outside calibration wavelength, and the apparatus further comprises means for identifying from the spectral sample data a proximate sample data value ($D_i$) for the selected proximate wavelength computing an outside sample data value ($D_o$) from an equation and means for including the outside sample data value in the spectral sample data for the multiplying.

33. The apparatus of claim 32 wherein a plurality of wavelengths is preselected as being wavelengths extended outside the range limit from the ordered wavelengths that are inside the limited range, the means for interpolating and normalizing each incorporate the extended wavelengths with the ordered wavelengths and further incorporate the outside calibration wavelength with the calibration wavelengths, and the apparatus further comprises means for directing substantially monochromatic radiation to the substitute analyzer at the plurality of ordered wavelengths so as to effect a corresponding plurality of third peak values, means for computing a corresponding plurality of outside sample data values from the equation for $D_o$, and means for including the plurality of outside sample data values in the spectral sample data for the step of multiplying.

34. An apparatus for generating a spectrum corrected for stray radiation, comprising:

a spectrometric instrument including a wavelength analyzer for effecting spectral data representative of spectral intensities in wavelength increments at ordered wavelengths across a spectral range, the instrument being operable with radiation from a sample source to effect spectral sample data for the wavelength increments and correspondingly for the ordered wavelengths;

a source of monochromatic radiation operably disposed to direct substantially monochromatic radiation to the analyzer at each ordered calibration wavelength such that, for each ordered wavelength, an initial pattern of spectral data is effected for the wavelength increments, the initial pattern having a peak profile at the ordered wavelength and being representative of stray radiation away from the peak profile, whereby the ordered wavelengths represent source wavelengths, and the wavelength increments function as receptor increments;

means for normalizing the initial pattern to effect a normalized pattern having a normalized peak profile;

means for deleting the normalized peak profile from the normalized pattern to effect a remaining pattern for each ordered wavelength;

means for substituting for each normalized peak profile a substitute profile based on the remaining pattern so as to effect a pattern of stray proportions representative of stray radiation, the stray proportions being identified to an ordered wavelength and respectively to the wavelength increments, whereby each ordered wavelength has an associated set of stray proportions identified thereto and respectively to the wavelength increments;

means for multiplying sample data for each ordered wavelength by each stray proportion identified to the ordered wavelength to effect stray portions of radiation identified to the ordered wavelength and respectively to the wavelength increments, whereby each wavelength increment has an associated set of stray portions identified thereto;

means for summing the stray portions identified to each wavelength increment to effect a total portion of stray radiation for the wavelength increment; and means for subtracting the total portion for each wavelength increment from corresponding sample data to effect corrected data for each receptor increment, whereby a set of corrected data effected for the wavelength increments is representative of a spectrum of the sample radiation corrected for stray radiation.

* * * * *